United States Patent [19]

Hoff, Jr.

[11] 3,714,474

[45] Jan. 30, 1973

[54] ELECTRON-VOLTAIC EFFECT DEVICE

[75] Inventor: Frederick B. Hoff, Jr., Bedford, Tex.

[73] Assignee: ECC Corporation, Euless, Tex.

[22] Filed: Oct. 7, 1970

[21] Appl. No.: 78,757

[52] U.S. Cl. ....................310/3 B, 148/187, 317/235

[51] Int. Cl. ...............................................G21d 7/00

[58] Field of Search .......310/3 R, 3 B; 148/175, 187; 317/235 A

[56] References Cited

UNITED STATES PATENTS

| | | | |
|---|---|---|---|
| 3,094,634 | 6/1963 | Rappaport | 310/3 R |
| 3,492,174 | 1/1970 | Nakamura et al. | 148/175 |
| 2,998,550 | 8/1961 | Collins et al. | 310/3 B |

*Primary Examiner*—Benjamin R. Padgett
*Assistant Examiner*—Harvey E. Behrend
*Attorney*—Giles C. Clegg, Jr. and Jack A. Kanz

[57] ABSTRACT

Disclosed is an electron-voltaic semiconductor power source comprising a semiconductor body with a PN junction terminating in a passivated channel on one surface of the device. A radioactive source with V less than the radiation damage threshold of the semiconductor is used to generate carriers within the semiconductor body and the entire device is shielded with a metal casing formed on the device surface which also serves as electrical contacts for the device.

8 Claims, 9 Drawing Figures

INVENTOR
*FRED B. HOFF JR.*

Jack A. Kanz
ATTORNEY

ELECTRON-VOLTAIC EFFECT DEVICE

This invention relates to low power battery devices utilizing the electron-voltaic effect. More particularly it relates to semiconductor device structures utilizing electron-voltaic effect to produce low current long-life voltage sources which may be easily interconnected in series or parallel. The devices are radioactive isotope electron sources which are suitably shielded so as to be advantageously used for emplanted power sources and the like.

It is well known that beta particles absorbed by semiconductor materials dissipate most of their energy by ionizing the atoms of the solid. When the carriers generated in this manner diffuse to the vicinity of a rectifying junction they induce a voltage across the junction. This phenomenon, which is similar to the well-known photovoltaic effect, is generally known as the electron-voltaic effect, and has been observed in most semiconductor materials.

Although the electron-voltaic effect is well known, little commercial exploitation of the phenomenon has occurred since radiation damage to semiconductor materials rapidly lowers the lifetime of the minority carrier and seriously degrades the efficiency of the device. Furthermore, because of the necessary shielding required to absorb radiation when the radiation source is contained within the device and the low power output characteristic of such devices, suitable encapsulation structures and processes have not previously been devised to produce a shielded device having an acceptable power to weight ratio. Also, because of the low output of electron-voltaic devices as compared to other energy sources, devices employing the phenomenon have found very little commercial application.

In accordance with the present invention an electron-voltaic power source is provided which comprises a body of semiconductor material containing a PN junction and a beta source incorporated within the device. The beta source is encapsulated within a protective metallic casing which not only acts as shielding to contain the radiation from the beta source but also provides electrical contact to the anode and cathode of the device. The electron-voltaic effect cell provided in accordance with this invention may be adapted for either series or parallel interconnection to provide a battery of any desired voltage or current capacity without the use of external interconnecting means or the like; the geometry of the devices being such that they may be simply stacked to provide the required current or voltage capacity. A method is also provided for producing a PN junction within the semiconductor body which has an area greater than the surface area of the semiconductor body in which it is formed, thereby providing a large junction area within the device so that minority carriers generated within the body of the semiconductor device are always near a junction. Furthermore, in accordance with the invention, the anode and cathode contacts are separated by a glass passivation layer which not only electrically isolates the contact surfaces of the device but passivates the junction at the surface of the device. The glass portion also may be utilized to provide radiation shielding of the junction area. Other features and advantages of the process and structure of the invention will become more readily understood from the following detailed description taken in connection with the appended claims and attached drawing in which:

Figure 1:
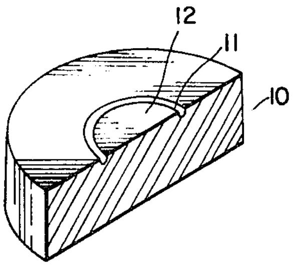
FIG. 1 is a perspective view, partially in section, of a semiconductor wafer in the initial stage of the preferred process for fabricating the device of the invention.
Figure 2:
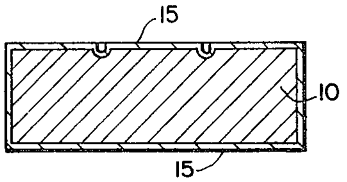
FIG. 2 is a perspective view, partially in section, of the device of FIG. 1 having an oxide layer formed thereon.

The preferred method of fabricating the device of the invention will be described with reference to FIGS. 1–5. A semiconductor wafer 10, such as N-type silicon, is formed in the shape of a disc approximately 0.004 to 0.010 inch thick with a diameter of approximately 0.2 to 0.5 inch and having substantially parallel opposed major faces. Such discs may be produced by any conventional method. By suitable conventional etching procedures, a circular trench or moat 11 is formed in the top major face of the wafer 10. The trench 11 forms an isolated mesa 12 centrally disposed on the top surface of the wafer 10. The entire surface of the wafer 10 is then oxidized to form an oxide coating 15 of approximately 1,000 to 10,000 angstroms thick.

Figure 3:
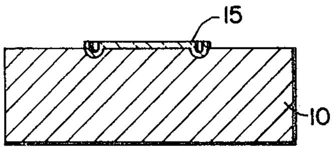
FIGS. 3 and 4 are perspective views, partially in section, of the wafter of FIG. 1 illustrating the steps of removing portions of the oxide layer and forming a diffused region in the exposed surfaces thereof.
Figure 4:
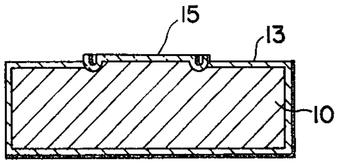

By suitable conventional photomasking and etching techniques the oxide layer 15 is stripped from all surfaces of the wafer 10 except that portion 12 of the top surface isolated by the circular trench 11 and the surface of the trench 11 as illustrated in FIG. 3. A PN junction 13 is then formed within the wafer of the disc by diffusing P-type conductivity determining impurities into all exposed surfaces of the disc. It will be observed that the oxide mask 15 overlying the central portion 12 and the trench 11 prevents the diffusion of P-type conductivity determining impurities into the surface protected by the mask. Accordingly, the PN junction terminates and intersects the surface of the disc only at the edge of the trench as illustrated in FIG. 4.

Figure 5:
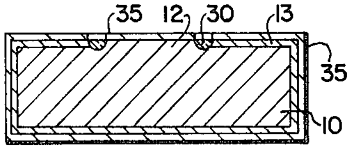
FIG. 5 is a perspective view, partially in section, of the completed device of the preferred embodiment of the invention.

By suitable masking and etching techniques that portion of the oxide layer 15 overlying the trenches is removed to expose trenches 11 and the trench refilled with a glass slurry. The glass slurry is then fused by conventional means to form a passivating glass ring 30 as shown in FIG. 5 by conventional glass passivation techniques. Any conventional glass composition suitable for passivation of the junction may be used. For insuring effective shielding of radiation from the isotope source, the passivating glass is preferably of relatively high heavy metal concentration.

A suitable radioactive source, such as $^{63}Ni$ is then deposited onto all exposed surfaces of the disc 10 to form a thin coating of the source material. Since the passivated junction is protected by the glass passivating ring 30 the isotope source is deposited only on the semiconductor surface plane but not at the junction. The isotope may be deposited by any suitable conventional method, such as by plating, evaporation or the like. The method used, of course, may vary with the choice of semiconductor material and radioactive isotope. For example, $^{63}Ni$ may be conveniently electrolessly plated on silicon.

After deposition of the isotope the entire surface of the disc is coated with an encapsulation material, preferably a heavy metal such as nickel. Nickel may be deposited on the entire surface by conventional techniques, thus forming a conductive coating 35 covering the central portion 12 and all of the portion of the surface of the disc previously coated with the radioactive isotope. However the passivating ring 30 is not coated, thus electrically isolating the central portion 12 from the remainder of the surface of the disc. After the final plating process, the top major face of the device may be polished so that the surface of the nickel covering the central portion 12 is coplanar with the surface of the nickel covering the remaining portion of the top major face of the disc. It will thus be observed that the nickel coating covering the central portion 12 forms an electrical connection with the N-type portion of the wafer, thus forming the cathode contact. Likewise, the nickel covering the remaining portion of the wafer contacts only the P-type diffused region and thus serves as an anode contact. It will also be observed that the nickel coating serves to completely encapsulate the radioactive material used as a beta source in the cell while serving as electrode contacts. Therefore, the entire surface of the disc, except for the portion covered by the glass passivation ring 30, is covered with a protective shield of nickel to prevent the escape of any radiation from the source material contained within the body of the device. However, the glass passivation ring 30 may be formed of a suitable glass, such as a glass containing about 40 percent lead oxide, to act as a radiation shield to prevent the escape of radiation from the device.

Beta particles emitted by the radioactive source contained between the surface of the semiconductor material and the encapsulation material are absorbed in the body of the semiconductor material creating hole-electron pairs which then migrate to the PN junction generating a voltage across the junction. Accordingly, the device disclosed may serves as a current or voltage source with the load interconnected between the nickel shielding covering the anode portion of the surface of the wafer and the nickel covering the cathode portion 12 of the top surface.

In the device illustrated in FIG. 5, electrical contact may be effected to either the anode or cathode by establishing electrical contact with the appropriate portion of the coating 35. Accordingly, the device may be easily inserted in a suitably formed bracket with pressure contacts adapted to engage the anode and cathode.

Figure 9:
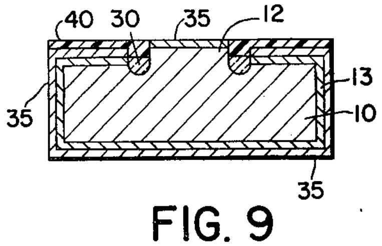
FIG. 9 is a sectional view of an alternate embodiment of the device illustrated in FIG. 5.

The device described may be modified as illustrated in FIG. 9 to permit series interconnection of a plurality of cells to form a battery. The device of FIG. 9 is identical to the device of FIG. 5 except that the central portion 12 which forms the cathode extends above the plane of the top surface. The extended portion 12 may be formed by depositing additional coatings of the encasement metal 35 on the mesa during the fabricating process or by epitaxially depositing semiconductor material on the mesa prior to depositing the metal layer 35. Alternatively, the exposed surface of the semiconductor body 10 may be etched while the mesa is covered with mask 15 as illustrated in FIG. 3 to lower the surface of the body below the plane of the surface of the mesa 12 before the diffused layer is formed. It will be observed that with the cathode portion 12 extending above the plane of the surface of the device, a second battery may be placed on the surface of the battery with the anode contact (the bottom surface as shown in FIG. 5) in contact with the cathode of the device of FIG. 9. Since the anode 12 extends above the major surface of the device, the anode of the second device will only contact the cathode of the first device. Alternatively, a suitable insulating layer 40 may be formed on the top surface of the device surrounding the cathode contact. Insulating layer 40 may be any suitable maTerial such as plastic, glass, mica, teflon or the like. Layer 40 may be formed by any suitable process, such as by spraying, painting, evaporating or the like, or may be secured to the surface of the device by suitable adhesives. The primary purpose of the layer 40 is to separate the anode contacts of adjacent batteries while permitting the anode of one device to contact the cathode of another device. However, by placing the surface of the layer 40 coplanar with the top of the cathode contact, the layer 40 may serve to provide support for the adjacent device and allow the devices to be conveniently stacked to provide series interconnection between a plurality of devices without external interconnection means.

Figure 6:
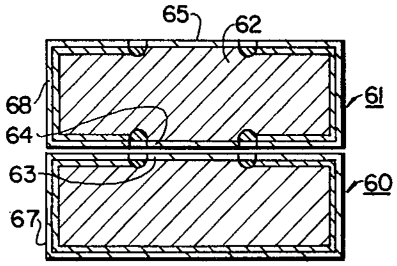
FIG. 6 is a sectional view of an alternate embodiment of the device of the invention illustrating the structure for interconnecting said devices in parallel.

An alternative embodiment of the device is illustrated in FIG. 6. The electron-voltaic device 60 is identical in all respects to the device described hereinabove with reference to FIGS. 1–5. Device 61 is identical to device 60 except that a cathode mesa 62 is formed on both major faces of the disc. It will thus be observed that when device 61 is placed in intimate contact with the top surface of device 60, cathode contact 63 on device 60 is placed in electrical contact with cathode contact 64 on device 61. The cathode contact 65 disposed on the opposite surface of device 61 may likewise be placed in electrical contact with the cathode contact of an additional device placed on the top surface of device 61. Likewise, the coated casings 67 and 68 on devices 60 and 61 are placed in intimate electrical contact by placing device 61 in contact with the top major face of device 60. It will thus be observed that the devices shown in FIG. 3 are interconnected in parallel, anode to anode and cathode to cathode. It will further be observed that any desired number of devices may be stacked in the manner illustrated in FIG. 6 by stacking additional devices of the configuration of device 61 on the top surface of device 61.

It should be noted that in silicon, for example, the energy required to dislodge an electron and form a hole-electron pair is about 1.1 MeV, while the average beta particle from a $^{63}$Ni source has an energy of about 0.021 MeV. Therefore, each beta particle emitted by the $^{63}$Ni may undergo multiple collisions with semiconductor atoms, thereby forming multiple hole-electron pairs. The number of collisions, of course, will vary with the thickness of the semiconductor body and the atomic cross section of the semiconductor material. However, it will be readily apparent that each particle emitted may potentially generate a large number of carriers.

As set forth hereinabove, voltage is generated by the device of the invention when charge carriers are created by the absorption of energy from beta particles within the body of semiconductor material. Furthermore, to cause a voltage across the PN junction the charge carriers generated by the absorption of energy from the beta particles must migrate to the vicinity of the PN junction. Accordingly, when the beta particle collides with atoms far removed from the PN junction, the carriers generated thereby are unable to diffused to the junction and generate a voltage. To avoid this difficulty, it is desirable to fabricate a device having a large area of PN junction disposed throughout the interior of the semiconductor body so that no matter where the charge carriers are generated they are within a short diffusion distance of a PN junction.

Figure 7:
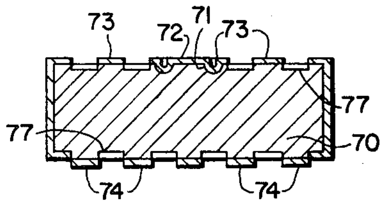
FIG. 7 is a perspective view, partially in section, of a semiconductor wafer illustrating an alternate method of forming a diffused layer therein.
Figure 8:
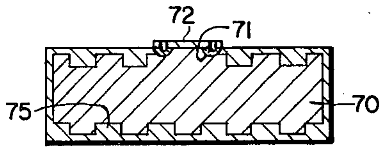
FIG. 8 is a perspective view, partially in section, of the wafer of FIG. 7 illustrating the expanded PN junction formed in accordance with the alternative process of the invention.

In the embodiment of the invention illustrated in FIGS. 7 and 8 the PN junction is not coplanar with the major faces of the disc but is formed in such a manner so as to have portions which extend well within the body of the device. The device illustrated in FIGS. 7 and 8 is formed in a manner similar to that described hereinabove with reference to FIGS. 1–5. A semiconductor disc 70 of suitable semiconductor material is formed having a circular channel 71 on at least one major face thereof and an oxide layer formed thereon as described hereinabove. The oxide layer is removed leaving only that portion 72 thereof covering the cathode mesa and the circular concentric rings 73 and 74 disposed on opposite major faces of the device. Preferably concentric rings of the oxide are formed on one major face of the device are positioned in relationship with each other such that the rings on one major face are in registry with the space between two rings on the opposite major face as illustrated in FIG. 7. Thereafter, a conductivity type determining impurity is diffused into the exposed portion of the surface of the wafer between the oxide rings forming diffused rings 77 on the surfaces of the disc. The oxide rings 73 and 74 are then removed and the wafer subjected to a second diffusion process. During the second diffusion the first P-type regions diffuse further into the body of the device while a second P-type diffusion layer forms in the surface previously covered by the oxide rings 73 and 74. The resultant PN junction is illustrated at 75 in FIG. 8.

The disc 70 may then be further processed as described hereinabove to produce an electron-voltaic effect device. It will be observed, however, that the PN junction 75 is not parallel to the surface of the device. Instead, the junction is parallel to the surfaces in some areas but perpendicular to the surface in other areas. Accordingly, since the junction is continuous and intersects the surface only within the trench 71, the area of the PN junction is much greater than the surface area of the device. It will also be observed that portions of the PN junction extend well within the body of the device.

It will be appreciated that several factors must be considered in determining the radioactive source for use with each semiconductor material. For use in silicon devices, $^{63}$Ni is particularly well suited. $^{63}$Ni has a half-life of 80 years. Furthermore, $^{63}$Ni $V_{\beta_{max}} = 0.063$ MeV, and $\overline{V} = 0.021$ MeV. Accordingly, the high energy beta particles are well below the 0.145 MeV radiation damage threshold for silicon. The power output of the device will, of course, be determined by the concentration and specific activity of $^{63}$Ni used as well as the size and geometry of the device.

Other beta sources having suitably long half-lives, such as $^{137}$Cs, $^{3}$H and $^{147}$Pm, may be used in combination with semiconductor materials having radiation damage thresholds above the $V_{\beta_{max}}$ of the isotope, such as III – V compounds and the like. It is important, however, that $V_{\beta_{max}}$ of the radioactive source be below the radiation damage threshold of the semiconductor material.

While the power output from a single device as described herein may be as low as a few microwatts, because of the unique design of the device, several devices may be interconnected in series or parallel to produce the voltage or current desired for a particular application. Furthermore, since the entire device is encapsulated in a radiation shield of relatively non-reactive material, the device may be particularly advantageous for use in apparatus such as heart pacers which are implanted in living bodies. Due to the long half-life of $^{63}$Ni in the specific embodiment described, such devices would not require replacement during the ordinary life-time of the patient using a heart pacer. Other applications utilizing the unique qualities of the device described will also become apparent to those skilled in the art.

It should also be noted that while the invention has been described with specific reference to the use of N-type substrates, P-type starting material may be used and N-type conductivity determining impurities diffused therein in a conventional manner.

It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed is:

1. A semiconductor device comprising:

a. a body of semiconductor material of a first conductivity type and having opposed major faces;

b. a trench formed in at least one major face surrounding a portion of the surface of said major face;

c. a region of semiconductor material of opposite conductivity type adjacent the surface of said body on said at least one major face thereof and forming a PN junction within said body, said PN junction terminating at said trench, whereby the conductivity type of the surface portion surrounded by said trench is the same as that of said body and opposite that of the surface surrounding said trench, d. a beta-emitting source adjacent at least a portion of said body of semiconductor material;

e. electrically insulating material substantially filling said trench; and f. an electrically conductive coating covering the entire surface of said body except said electrically insulating material.

2. The device defined in claim 1 wherein $V_{\beta max}$ of said beta-emitting source is less than the radiation damage threshold of said semiconductor material.

3. The device defined in claim 2 wherein said semiconductor material is silicon, said beta-emitting source is $Ni^{63}$, and said coating is substantially nickel.

4. The device defined in claim 1 wherein said insulating material is glass.

5. The device defined in claim 1 wherein the surface portion surrounded by said trench is removed from the plane of the major face surrounding same.

6. The device defined in claim 5 and further including an insulating material adjacent said major face surrounding said trench, the surface of said insulating material being substantially coplanar with the surface portion of said device surrounded by said trench.

7. The device defined in claim 1 wherein trenches are formed on both opposed major surfaces of said body and said PN junction intersects the surface of said body only within said trenches.

8. A semiconductor device comprising:

a. a body of semiconductor material of a first conductivity type and having opposed major faces;

b. a trench formed in at least one major face thereof surrounding a portion of the surface of said major face;

c. a continuous PN junction formed within said body of semiconductor material, said PN junction intersecting the surface of said body within said trench, and being substantially parallel to said major face in some areas and substantially perpendicular to said major face in other areas within said body, the surface of said major face surrounded by said trench being of said first conductivity type and the remainder of said surface of said body being of opposite conductivity type;

d. a beta-emitting source adjacent at least a portion of said surface of opposite conductivity type;

e. electrically insulating material covering the surface of said trench; and f. an electrically conductive coating covering the entire surface of said device except the trench.

* * * * *